x

US010255506B2

(12) United States Patent
Lorenzoni (10) Patent No.: US 10,255,506 B2
(45) Date of Patent: Apr. 9, 2019

(54) INFRARED RADIATION FIRE DETECTOR WITH COMPOSITE FUNCTION FOR CONFINED SPACES

(71) Applicant: A.M. GENERAL CONTRACTOR S.P.A., Genoa (IT)

(72) Inventor: Giovanni Pietro Lorenzoni, Genoa (IT)

(73) Assignee: A.M. General Contractor S.P.A. (IT)

( * ) Notice: Subject to any disclaimer, the term of this patent is extended or adjusted under 35 U.S.C. 154(b) by 5 days.

(21) Appl. No.: 15/356,130

(22) Filed: Nov. 18, 2016

(65) Prior Publication Data
US 2017/0147884 A1   May 25, 2017

(30) Foreign Application Priority Data

Nov. 25, 2015   (IT) .................. 102015000076476

(51) Int. Cl.
*G01J 5/08* (2006.01)
*G01J 5/12* (2006.01)
(Continued)

(52) U.S. Cl.
CPC ........ *G06K 9/00771* (2013.01); *G01J 5/0018* (2013.01); *G01J 5/089* (2013.01);
(Continued)

(58) Field of Classification Search
CPC .... H04N 5/427; G06K 9/00771; G01J 5/0018
See application file for complete search history.

(56) References Cited

U.S. PATENT DOCUMENTS 4,785,174 A * 11/1988 Hodges ............... G01J 5/0014
250/338.1
5,427,733 A * 6/1995 Benda ................. B22F 3/1055
264/40.1
(Continued)

FOREIGN PATENT DOCUMENTS

EP   2730316 A1   5/2014
EP   2801960 A1   11/2014
WO   2004008407 A1   1/2004

OTHER PUBLICATIONS

Italian Search Report in corresponding Italian Application No. ITUB20155886.
(Continued)

*Primary Examiner* — Jayanti K Patel
*Assistant Examiner* — Irfan Habib
(74) *Attorney, Agent, or Firm* — Waller Lansden Dortch & Davis, LLP; Matthew C. Cox (57) ABSTRACT

Infrared radiation fire detector, comprising a curved support surface and a plurality of infrared radiation sensors arranged on the support surface. Each sensor comprises a planar array of infrared radiation-sensitive elements, having a respective sight direction and a solid angle of view defined around the sight direction, which define a field of view associated to the sensor. The sight directions of the sensors intersect with one another at a central point and the sensors are spaced apart from one another by a given angular distance referred to the central point, the solid angles of view of the sensors having a same narrow width so that the fields of view of the sensors are non-intersecting with one another.

1 Claim, 12 Drawing Sheets (51) Int. Cl.
*G06T 7/70* (2017.01)
*G06K 9/00* (2006.01)
*G01J 5/00* (2006.01)
*H04N 5/247* (2006.01)
*H04N 5/33* (2006.01)
*G08B 17/12* (2006.01)

(52) U.S. Cl.
CPC .................................. *G01J 5/12* (2013.01); *G06T 7/70* (2017.01); *G08B 17/125* (2013.01); *H04N 5/247* (2013.01); *H04N 5/33* (2013.01); *G01J 2005/0077* (2013.01); *G01J 2005/123* (2013.01)

(56) References Cited

U.S. PATENT DOCUMENTS

| | | | | |
|---|---|---|---|---|
| 6,215,116 B1* | 4/2001 | Van Marcke | ........... | E03C 1/057 250/214 A |
| 6,710,346 B2* | 3/2004 | Brewington | ........... | G01S 17/026 250/341.8 |
| 7,155,029 B2* | 12/2006 | King | ........... | G08B 17/125 382/100 |
| 7,245,315 B2* | 7/2007 | Sadok | ........... | G08B 17/125 348/143 |
| 7,256,818 B2* | 8/2007 | Sadok | ........... | G08B 17/125 340/578 |
| 7,280,696 B2* | 10/2007 | Zakrzewski | ....... | G06K 9/00771 382/218 |
| 8,049,155 B2* | 11/2011 | Weigen | ........... | H03K 17/941 250/208.1 |
| 8,134,461 B2* | 3/2012 | Van Doorn | ........ | H05B 33/0803 340/539.17 |
| 8,796,627 B2* | 8/2014 | Rockwell | ........... | G01N 21/4738 250/341.8 |
| 9,449,240 B2* | 9/2016 | Lorenzoni | ............ | G08B 17/125 |
| 9,990,825 B2* | 6/2018 | Rao | ........................ | A62C 37/36 |
| 2009/0014657 A1* | 1/2009 | Cole | ............... | G08B 13/19602 250/353 |
| 2009/0123074 A1* | 5/2009 | Chen | ................... | G06K 9/00771 382/190 |
| 2010/0117839 A1* | 5/2010 | Lee | ...................... | G08B 17/125 340/577 |
| 2011/0003269 A1* | 1/2011 | Portoghese | ............ | F41A 33/02 434/18 |
| 2012/0001760 A1* | 1/2012 | Harchanko | ............ | G08B 17/12 340/578 |
| 2012/0229283 A1* | 9/2012 | McKenna | ............... | G08B 17/06 340/584 |
| 2012/0314066 A1* | 12/2012 | Lee | ...................... | G08B 17/125 348/143 |
| 2014/0334674 A1* | 11/2014 | Lorenzoni | ........... | G08B 17/125 382/103 |

OTHER PUBLICATIONS

Italian Written Opinion in corresponding Italian Application No. ITUB20155886.

* cited by examiner

INFRARED RADIATION FIRE DETECTOR WITH COMPOSITE FUNCTION FOR CONFINED SPACES

The present invention relates in general to radiated thermal energy data detection systems in a space by means of infrared radiation image processing.

The publication EP 2801960 by the same Applicant describes a method for the detection of radiated thermal energy data in a space by means of infrared radiation image processing, the method comprising the steps of:
receiving a plurality of sequential images in the infrared radiation of the space, each of said images comprising an array of pixels with each pixel having a value that is representative of a temperature;
processing successive images of said plurality of sequential series of images to determine a change of at least one thermal parameter that meets predetermined alarm criteria; and
detecting an event in the space based on the determined change in the thermal parameter.

One aim of the present invention is to make available a fire detection system which can be manufactured from relatively simple components but which allows high levels of precision to be achieved.

For this purpose, the subject of the invention is an infrared radiation fire detector, comprising a curved support surface and a plurality of infrared radiation sensors arranged on the supporting surface,
wherein each sensor comprises a planar array of infrared radiation-sensitive elements having a respective sight direction and a solid angle of view defined around the sight direction, which define a field of view associated with the sensor, and
wherein the sight directions of the sensors intersect with one another at a central point and the sensors are spaced apart from one another by a given angular distance referring to the central point, the solid angles of view of the sensors having a same narrow width such that the fields of view of the sensors are non-intersecting with one another.

Also subject to the invention is a method for detecting radiated thermal energy data in a confined space by infrared radiation image processing, the method comprising the steps of:
receiving a plurality of sequential series of infrared radiation images of the space, each of said images comprising an array of pixels, each pixel having a value that is representative of a temperature;
processing successive images of said plurality of sequential series of images to determine a change of at least one thermal parameter that meets predetermined alarm criteria; and
detecting an event in the space based on the determined change in the thermal parameter;
the method being characterized by using at least one infrared radiation fire detector comprising a curved support surface and a plurality of infrared radiation sensors arranged on the support surface,
wherein each sensor comprises a planar array of infrared radiation-sensitive elements, having a respective sight direction perpendicular to the array and a solid angle of view defined around the sight direction, which define a field of view associated to the sensor,
wherein the sight directions of the sensors intersect with one another at a central point and the sensors are spaced apart from one another by a given angular distance referred to the central point, the solid angles of view of the sensors having a same narrow width such that the fields of view of the sensors are non-intersecting with one another, and
wherein each sequence of images is detected by a respective sensor of the fire detector.

In particular, the method further comprises
identifying a position of a source associated to the detected event, a first fraction of the infrared radiation emitted by the source being detected directly by only one of the sensors of the fire detector, and a second fraction of the infrared radiation emitted by the source being detected by at least another sensor of the fire detector after having been reflected by at least one surface of the space, the position of the source being calculated as a function of a geometrical relationship between the sight directions of the sensor that detects the first fraction of the infrared radiation and the at least another sensor that detects the second fraction of the infrared radiation.

With the detector and the method according to the invention, it is possible readily and with a high degree of reliability to detect the start of a fire, avoiding false alarms (an assessment of entropy in quantum terms is possible with error less than $10^{-8}$ and such as to ensure functional safety levels greater than $10^{-6}$). It is also possible to safely localize the start of a fire, thus allowing the actions aimed at thwarting the phenomenon detected to be effectively activated (direct activation of extinguishing devices, transmission of alarm messages with the extent of the risk both locally and remotely).

The detector according to the invention is adaptable to any configuration of systems in confined spaces, and can monitor areas at a 360° angle.

Further features and advantages of the detector and the method according to this invention will become apparent from the detailed description that follows, provided with reference to the accompanying drawings by way of non-limiting example, in which:

Figure 1:
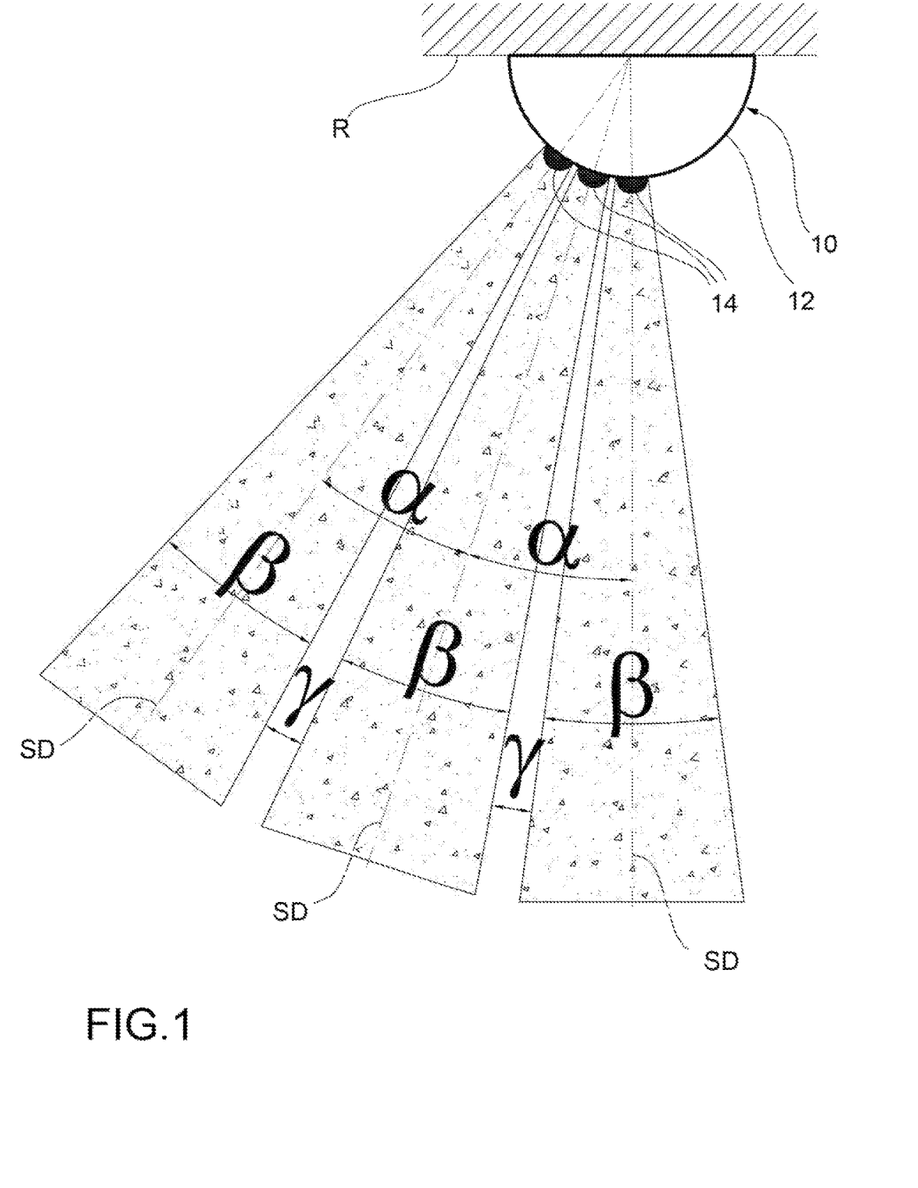
FIG. 1 illustrates the principle of a detector according to the invention.
Figure 3:
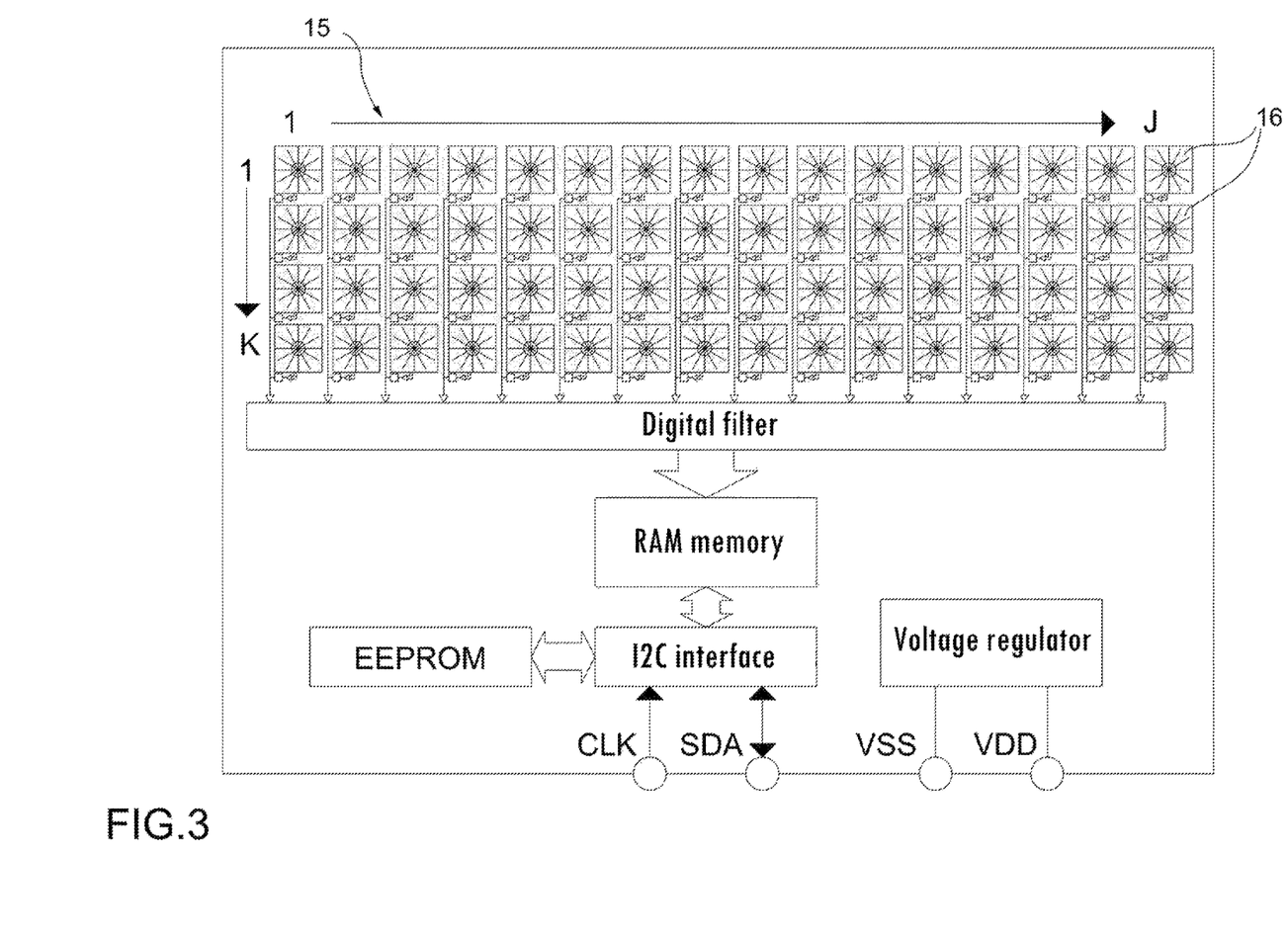
FIG. 3 illustrates schematically the architecture of a thermopile array sensor to be used for the detector of FIG. 2.

With reference to FIG. 1, an infrared radiation fire detector according to the invention is schematically shown, indicated with 10. The detector 10 essentially comprises a curved support surface 12 and a plurality of infrared radiation sensors 14 arranged on the support surface 12. The support surface 12 can have for example a cylindrical shape or a spherical cap. The sensors 14 are substantially point-like, and may be, for example, of the thermopile array type. Each sensor 14 comprises a planar array 15 formed by the infrared radiation-sensitive elements 16 (represented in FIG.

3). The array 15 and the optics of each sensor identify a respective sight direction SD (FIG. 1) of the sensor, perpendicular to the array 15, and a solid angle of view β defined around the sight direction SD. For each sensor 14 is thus defined a field of view associated with the sensor 14. For simplicity, in FIG. 1 the angle β is represented as a plane angle, while the sensors 14 are represented only in a one-dimensional distribution.

The sight directions SD of the sensors 14 intersect with one another at a central point C and the sensors 14 are spaced apart from one another by a given angular distance referring to the central point C. The solid angles of view β of the sensors 14 have a same narrow width such that the fields of view of the sensors 14 are non-intersecting with one another.

The number N of sensors, their orientation, their reciprocal positions within the detector 10 are sized to ensure total coverage of the space to be monitored.

By means of the arrangement indicated above, each sensor is associated with a single region of the overall monitored volume. Therefore, each sensor 14 captures, over time, a sequence of infrared radiation images (each image being formed by a pixel array) of the region of the space associated with it.

The adoption of the individual sensors in "narrow" width, or with a reduced number of sensitive elements (pixels), allows the evaluations to be made free from the refraction and compensation errors that normally occur between adjacent sensitive elements because of interference effects typical both of the focusing lenses and/or filtering of the radiometric waves and the boundary conditions.

Every single sensor 14 of sensitive J×K elements, positioned within the detector 10, is arranged in an angular way so that its sight direction SD has an angular distance α from the next one and covers a sight angle β. γ indicates an interstitial angle that creates adjacent fields of view. This angle γ is directly proportional to the angle of refraction of the radiometric wave in the crossing of the optics (generally of germanium crystal) and is representative of the error reading correction function linked both to the reflection error associated with crystal lattice planes and to the boundary error that is proportional to the wavelength with respect to the read cell size.

The angle γ is characterized by refraction and by the size of the read cell (single sensitive element), and therefore dependent on the curvature of the converging optic of the sensor and the wavelength. Large γ values will be the effect known as chromatic aberration due to the focus shift. Applying Snell's law of refraction, $\gamma=[\arcsin(n*\sin(\delta-\arcsin((1/n)*\sin \alpha)))$ is obtained, where n=1 for air, α is the angle of refraction of the material and $\delta=(\Delta)/R*\sin((\psi+\theta n)/2)/\sin(\psi/2)$, obtained by interpolating the equation of the spherical diopter.

Using a germanium lens, characterized by a refractive index of 4.0026 and a curvature radius R=10 mm, in the case of an angle covered by a single pixel β=(15/x°), a γ value equal to 1.82° is obtained, the limit value to prevent the adjacent pixel, placed at an angle $\beta 1=((15/x)*(x+1))$, from being affected by interference.

The angle γ is also sized such that the areas not covered by the sensors are of such dimensions as to be able to give rise, at most, only to events irrelevant from the point of view of fire monitoring.

Moreover, the adoption of restricted vision sensors allows for the elimination, or at least reduction, of the error amplification effect associated with the angle, which normally is particularly important in measurements made at points that are far from the optical axis of the sensor.

By virtue of these effects, it is possible to contain the total error from the sensors, which at the first approximation can be on the order of $10^{-8}$.

As indicated above, each sensor 14 of the detector 10 can be of the thermopile array type, whose usual architecture is represented in FIG. 3. Each sensing element 16 of the array 15 is associated with the average temperature of everything that falls within their field of view. The sensor is then able to reproduce in real time a map of the temperatures observed while avoiding the use of expensive bolometric devices.

In the architecture shown in FIG. 3, each sensing element 16 incorporates an amplifier stage, an analog-digital converter (ADC) and a sensor with output proportional to the absolute temperature (PTAT) to measure the chip temperature. The outputs of the elements 16 and the PTAT sensors are stored in RAM memory and accessible via the I2C interface from an external microcontroller, which can then calculate the temperatures of each pixel.

Figure 4:
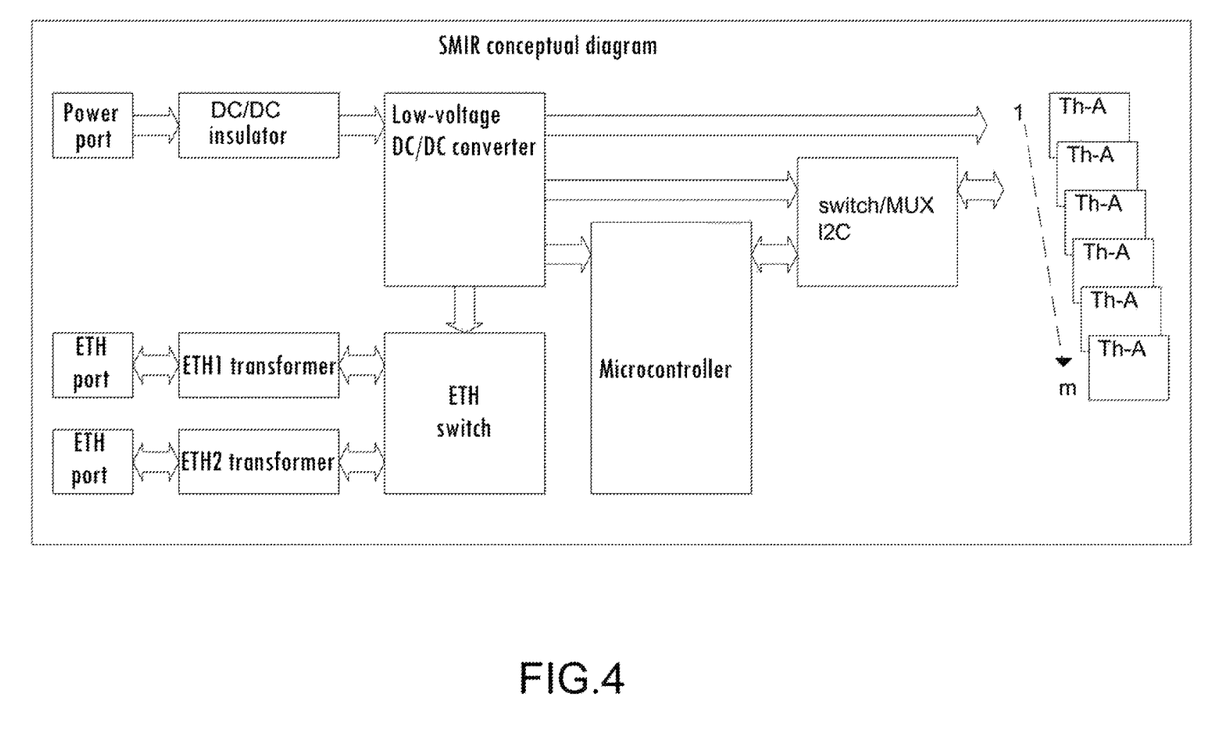
FIG. 4 illustrates schematically the architecture of an example of a detector according to the invention.

With reference to FIG. 4, the detector 10 integrates a microcontroller sized to acquire, with a predetermined and configurable frequency, the data saved in the RAM of the sensors 14, calculating the temperature of each pixel, to identify the possible presence of thermal anomalies on the basis of a predefined algorithm and transferring the results to a central fire alarm control panel.

As a functional principle, the presence of a thermal anomaly, a prealarm or an alarm, must be transferred in real time to the central fire alarm control panel. Any diagnostic data (relevant changes of status) must also be transferred in real time to the central fire alarm control panel on request or in unsolicited mode with a configurable period. The central fire alarm control panel can request the transfer of additional information, for example the temperature of a single pixel or configuration data.

For communication with the central fire alarm control panel, the implementation of two redundant Ethernet channels is provided, which enables a ring and daisy chain configuration.

It is also provided that the detector 10 supports a non-volatile memory for storing configuration and inventory data.

The NETD (thermal resolution) of the sensors changes depending on the refresh rate of the RAM, which can be set between 0.5 Hz and 512 Hz. The NETD at 4 Hz is 0.2K (0.2° C.). Higher frequencies mean higher noise levels: the frequency can be set to achieve the desired balance between the refresh rate and the resolution of the measurement.

Each thermopile array sensor assumed to be the non-configurable fixed address type on the I2C bus makes it necessary to use a switch/mux I2C for adapting between the microcontroller and sensors.

Figure 2:
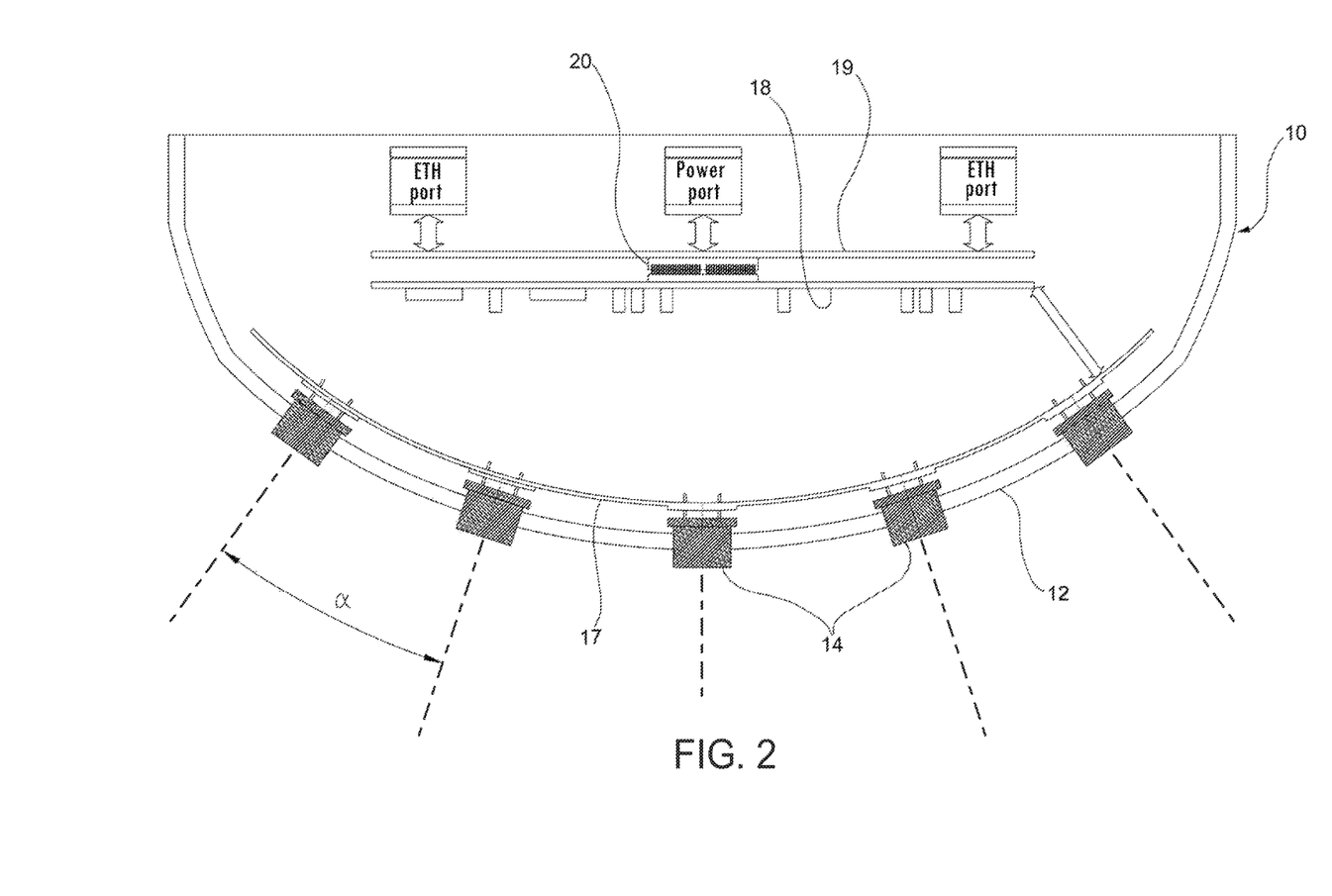
FIG. 2 illustrates schematically the structure of an example of a detector according to the invention.

With reference to FIG. 2, the detector 10, as an electronic device that implements a safety function in detecting fires, can be conceptually equipped with:
  two isolated Ethernet ports 10-100 Mbit/sec Base-T(X) with PoE support on IEEE std 802.3 for 10Base-T, IEEE std 802.3u 100Base-TX and IEEE std 802.3af for PoE connectors (screw type)
  a power port (with screw connector)
  an optional port for I/O (with std connector).

The detector 10 must be made in a compact form and must be able to be installed on the ceiling or on the side walls of a generic space.

To meet the safety and reliability requirements, the detector must be provided with the appropriate connectors to ensure robust and stable connections even under conditions of shock and vibration according to the most restrictive European regulations (e.g. EN 50155).

FIG. 2, in a purely indicative manner, shows an idea of the mechanics with the orientation and position of the sensors 14. As a guide, the maximum dimension of the detector is conceivable to be about 100 mm, while the sensors are on the order of 5 mm.

The sensors 14 may be mounted on a printed flexible- or semi-flexible-type circuit 17, which allows the desired orientation. The printed circuit will be dependent on the application depending on the number of sensors, their orientation and their reciprocal position. In FIG. 2, 18 indicates a diagram of the microcontroller, and 19 an adapter and interface diagram. The diagrams are connected to one another via a connector 20.

Figure 5:
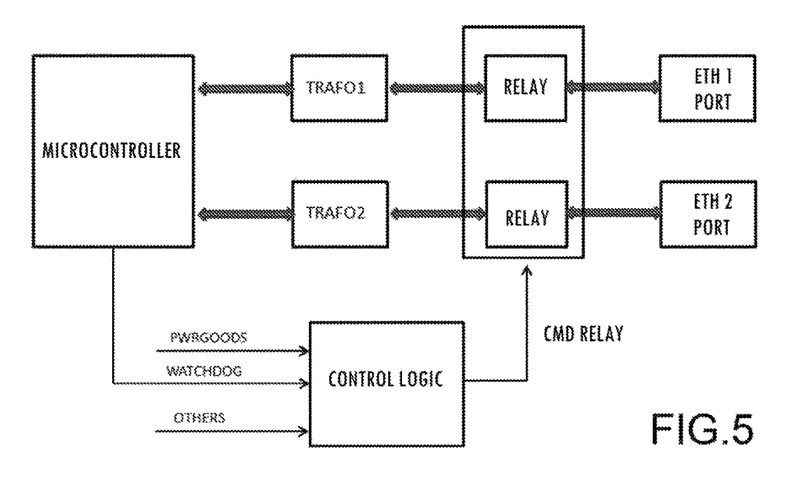
FIGS. 5 and 6 illustrate two different modes of communication between the units of the detector.
Figure 6:
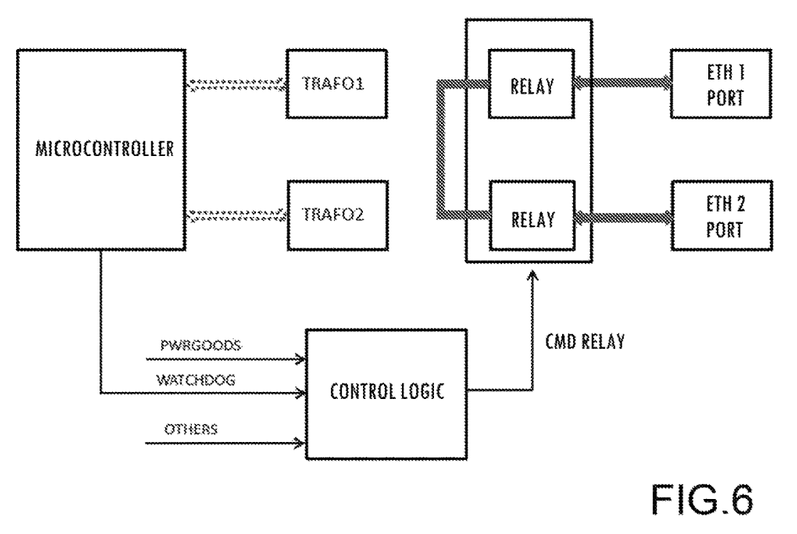

An effort-benefit evaluation is the ability to support a Hardware Bypass feature between the two Ethernet ports: the bypass is automatically activated in the presence of a power fail, a hardware or software malfunction (an example of configuration with deactivated bypass is shown in FIG. 5; an example of configuration with active bypass is shown in FIG. 6). The bypass function, implemented with relays, ensures the activation even in the absence of power.

Figure 7:
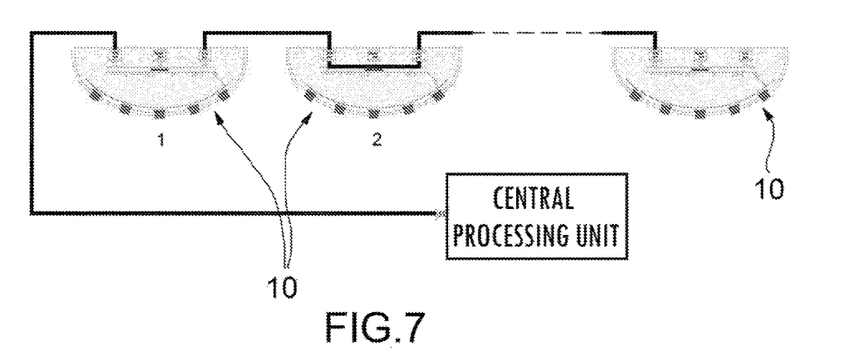
FIGS. 7 and 8 illustrate two different modes of operation for a system comprising a plurality of detectors.
Figure 8:
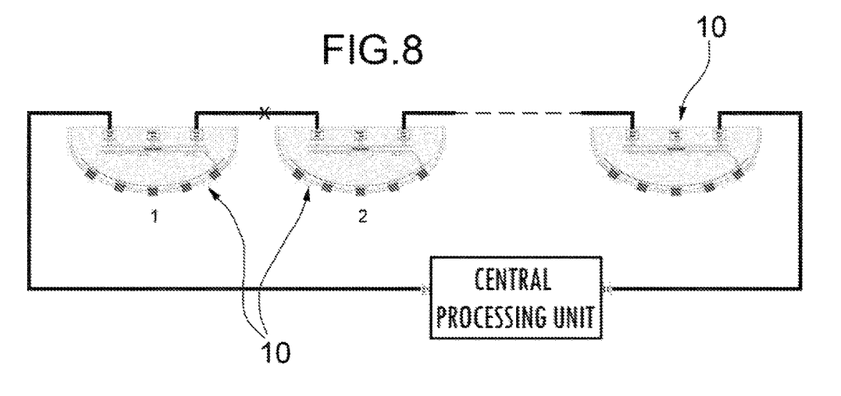
Figure 9:
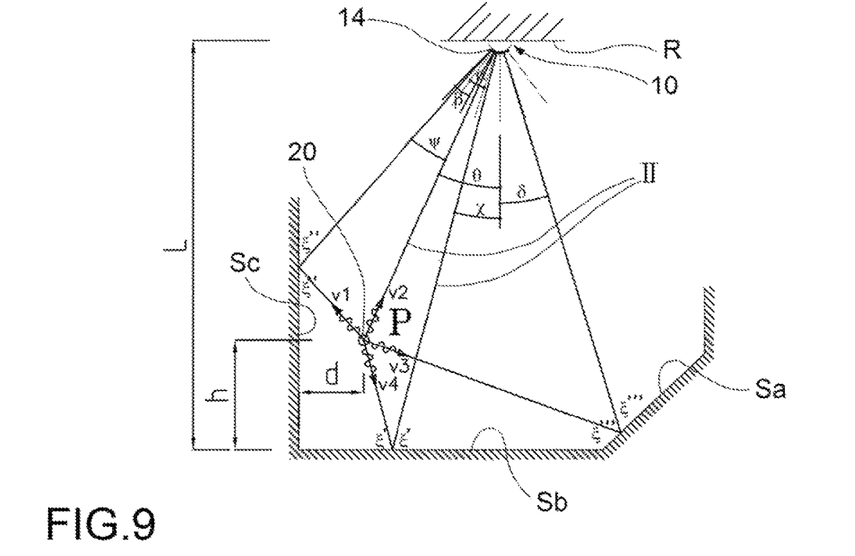
FIGS. 9 to 13 illustrate the geometric principles of localization of energy sources with the detector according to the invention.

This function is especially useful in daisy-chain configurations (FIG. 7). In a ring configuration (FIG. 8), when a detector of the loop fails or a link is interrupted, the others can still be reached (the hardware bypass is not necessary).

The single detector may also operate in a stand-alone configuration: a set of I/O signals identifying the prealarm, alarm and diagnostic states will be available on a dedicated connector.

The detector described above is programmable, upgradeable and configurable via Ethernet.

In FIGS. 9 to 13, the geometric principles underlying the localization of a heat source in the monitored space are represented. In these figures, a space or confined volume to be monitored is shown schematically, for example, a part of the internal space of a wagon W. For the purposes of the present invention, "confinement" means a volume of finite dimensions, at least in part delimited by a set of solid surfaces, designated by Sa, Sb and Sc in the figures. The detector 10 is applied to a ceiling R of the confined space. In FIGS. 9-13, 20 indicates a source of thermal energy, I indicates a first fraction of the infrared radiation emitted by the source 20, which is detected directly by a sensor 14 of the detector 10, and II indicates one or more second fractions of the infrared radiation emitted by the source 20, which is detected by at least one other sensor 14 of the detector 10 after having been reflected by at least one of the surfaces Sa, Sb and Sc of the space.

To better describe the characteristics of the method in its composite functions, two fundamental logics are considered separately: establishment of the quantitative variation (detection) and determination of the spatial arrangement (localization).

Detection

The correlation between radiation and temperature is provided by the Stefan-Boltzmann law, which expresses the relationship between the energy density q and the temperature T with the relation $q=\varepsilon\sigma T^4$, where $\varepsilon$ is the emissivity of the emitting surface (variable between the theoretical limits 0 and 1), $\sigma$ is the Stefan-Boltzmann constant (universal) and equals $5.6703\times10^{-8}$ W×m$^{-2}$×K$^{-4}$, and T is the absolute temperature.

That is, the detection of the infrared radiation allows the absolute values and the variations in temperature of the objects to be displayed, regardless of their illumination in the visible range. The amount of radiation emitted increases proportionally to the fourth power of the absolute temperature of an object.

This allows the detection of "anomalies" in the emission of energy, and therefore, with the same emissivity, thermal anomalies.

Interpreting the above-mentioned law on the principles of thermodynamics and considering an infinitesimal change in entropy, we can write:

$$dQ/T=(dq+pdV)/T=1/T[d(q(T)V)+p(T)dV]=1/T[q(T)+p(T)]dV+[(V/T)*(dq(T)/dT)]dT$$

from which $$dS/dV=(q+p)/T=4u/3T$$

Since dS is an exact differential, $$dS/dT=(V/T)dq/dT$$

Being that $$d/dT(dS/dV)=d/dV(dS/dV)$$

$$-4/3q/T^2+4/3q'/T=q'/T$$

$$q=\varepsilon\sigma T^4$$

Therefore, in terms of entropy $$S=4/3\varepsilon\sigma T^3 V+\text{constant}$$

This equation is the basis of one of the calculation functions present in the evaluation algorithm and correlates the temperature detected by the sensor with the volume portion controlled by it.

The temperature values and the values of entropy variations, integrated in time and evaluated according to the derivative relative to the single energy change in the field of significant values, determine the condition of a "classifiable" event which serves to generate the recognition function of "prealarm" and "alarm" for the intervention of extinguishing devices.

The fundamental parameter of the entropic variation, which represents the characterizing element of the detection function, is the change in entropy in unit time that is the same for all direct or indirect detection of the same source and that can be defined with $q_x=m*(\varepsilon\sigma T^4)$, where m is the coefficient determined by the "reflection" of the source, which can also be seen as a characteristic coefficient dS/dT (dt). Therefore, the source can be localized through its emission of direct and reflected energy.

Localization

Taken for reference a "source" element of energy placed in a generic position P in the space controlled by the detector (see FIG. 9), if considered at the point P, we can define a series of "vectors" of energy radiating from the source and belonging to the same plane to which both the source and the detector belong, or the plane Span (v_1, v_2, . . . ), which represents a linear combination of independent vectors.

This combination of vectors allows the source to be identified and localized.

Figure 10:
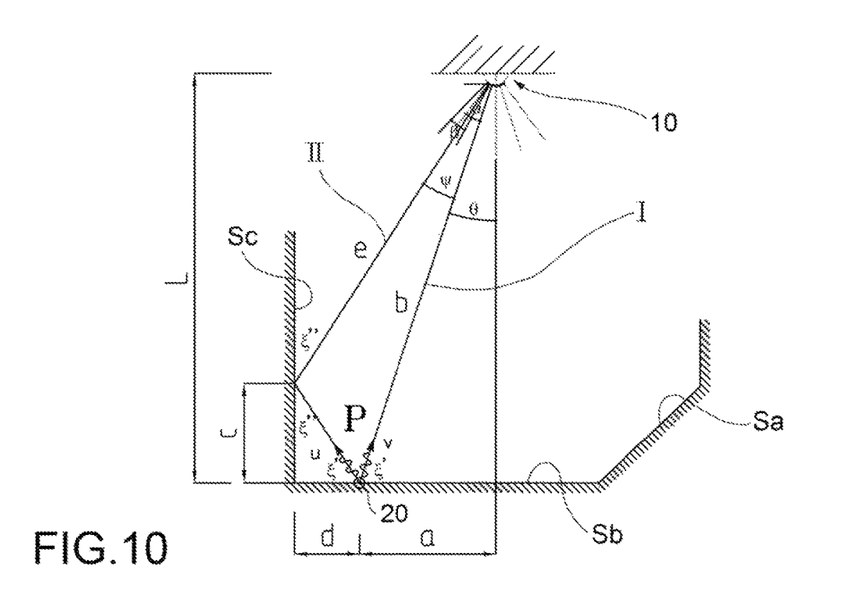

For the sole purpose of simplifying the interpretive procedure of the calculation logic, reference will be made temporarily to the limiting case of FIG. 10 where the source is placed on a partition wall of the volume. In this way, it is limited only to the number of "reflections" of energy, which is at least one and is sufficient to define the processing method.

By examining the two independent vectors u and v and the triangle formed by them, and the values of θ and ψ (data from the detector) being known, we have:

b=L/sin θ; a=L ctg ξ; e/sin(180−2ξ')=b/sin(180−2ξ") (Euler); $c^2+d^2=e^2+b^2-2e*b*\cos \psi$ (Carnot)

Therefore, we can determine a and L (if L is not known).

Returning to the generic configuration, identical considerations are made for the determination of h and d values that identify the position of the source in the space. To obtain these values, the detector must be able to read at least two reflection values, or at least two of the vectors v1, v3, v4 of FIG. 10. This condition is always verifiable.

Note that the evaluation logic identifies a plane (the plane of the vectors u and v) in the absolute spatial reference. When this plane is identified, it is reported to the relevant system, taking into consideration only the plane containing the vectors considered as it is only on this finite dimensional plane that further evaluations are performed. If there are energy values more related to other vectors lying on another plane, this will be the reference plane, and the processing will continue on this plane. This allows the dramatic reduction of the amount of data and reports to be prepared.

At the completion of the foregoing, in order to transcribe the reference equations of the primary algorithm in final form, it is necessary to integrate a new concept on the magnitudes detected.

For reference, the system is assumed from the point of view of the radiation source.

Figure 11:
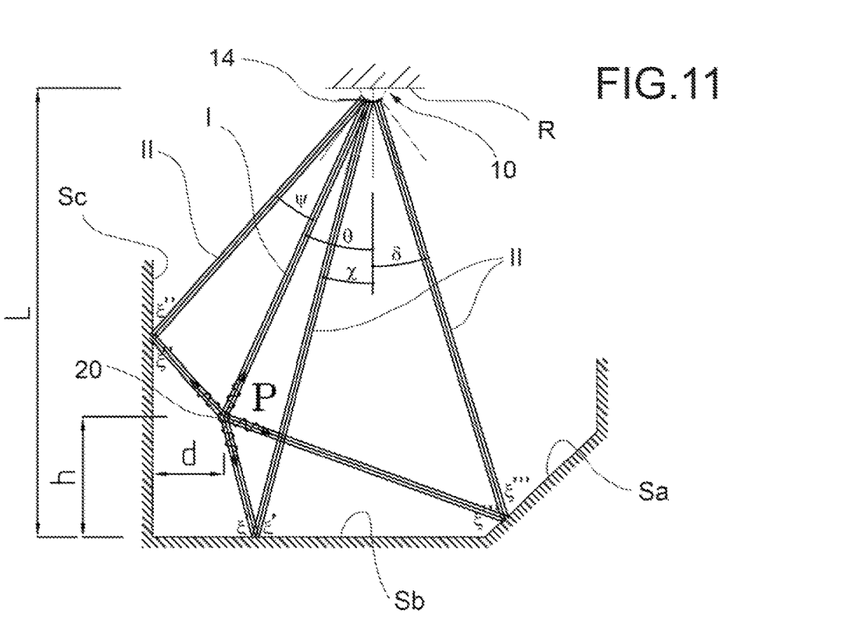
Figure 12:
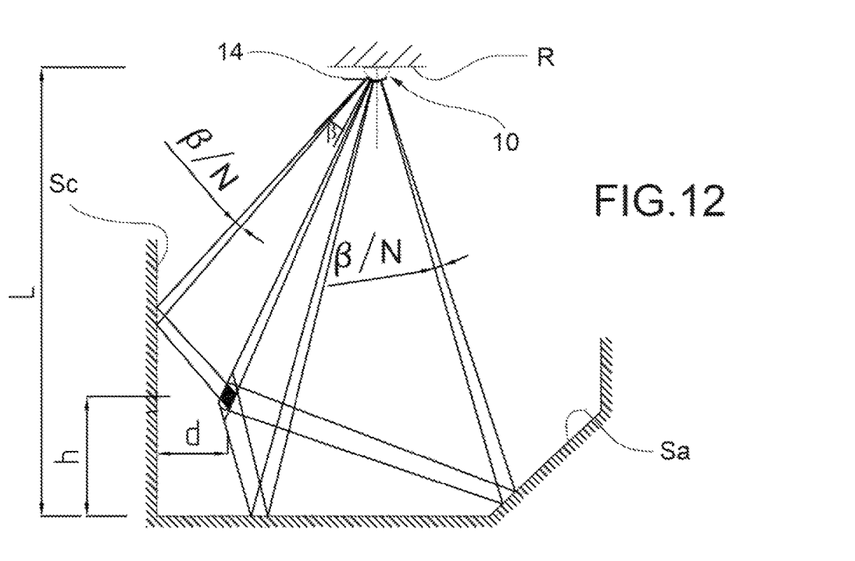

Referring to FIG. 11, relative to the emissions of the generic source, it has been found that the radiation emitted in every direction (and in all directions) is homogeneous (equal intensity vectors), and as previously stated corresponding to $q_x=m*(\varepsilon \sigma T^4)$, where m represents the coefficient proportional to any reflection and which is characteristic of the material constituting the reflective surface. For direct energy, m=1 (not reflected); whereas for other surfaces, made of solid materials, m will have a value between 0.5 and 0.95. It is to be considered that the value of m does not influence the calculation of the energy evaluation, as it is the change in energy that is interesting and not its absolute value.

Taking as a reference the point of view of the detector, as shown in FIG. 11, the view of the individual sensors of the detector is a cone of aperture β. Considering as a reference the angle of a single pixel, which is equal to β/N, where N is the number of pixels of the sensor in the reference direction, the view of a radiant source is identifiable by the intersection of all the cones.

As the sensors are all the same, the angle of view β/N is the same in all directions. If we look at the source from the point of view of the sensors, in the directions of the direct and reflected radiation, we find that the intersection of the various conical beams encloses our source, and the volume identified is proportional to the actual distance between the sensor and the radiating element. The volume is therefore determined.

Figure 14:
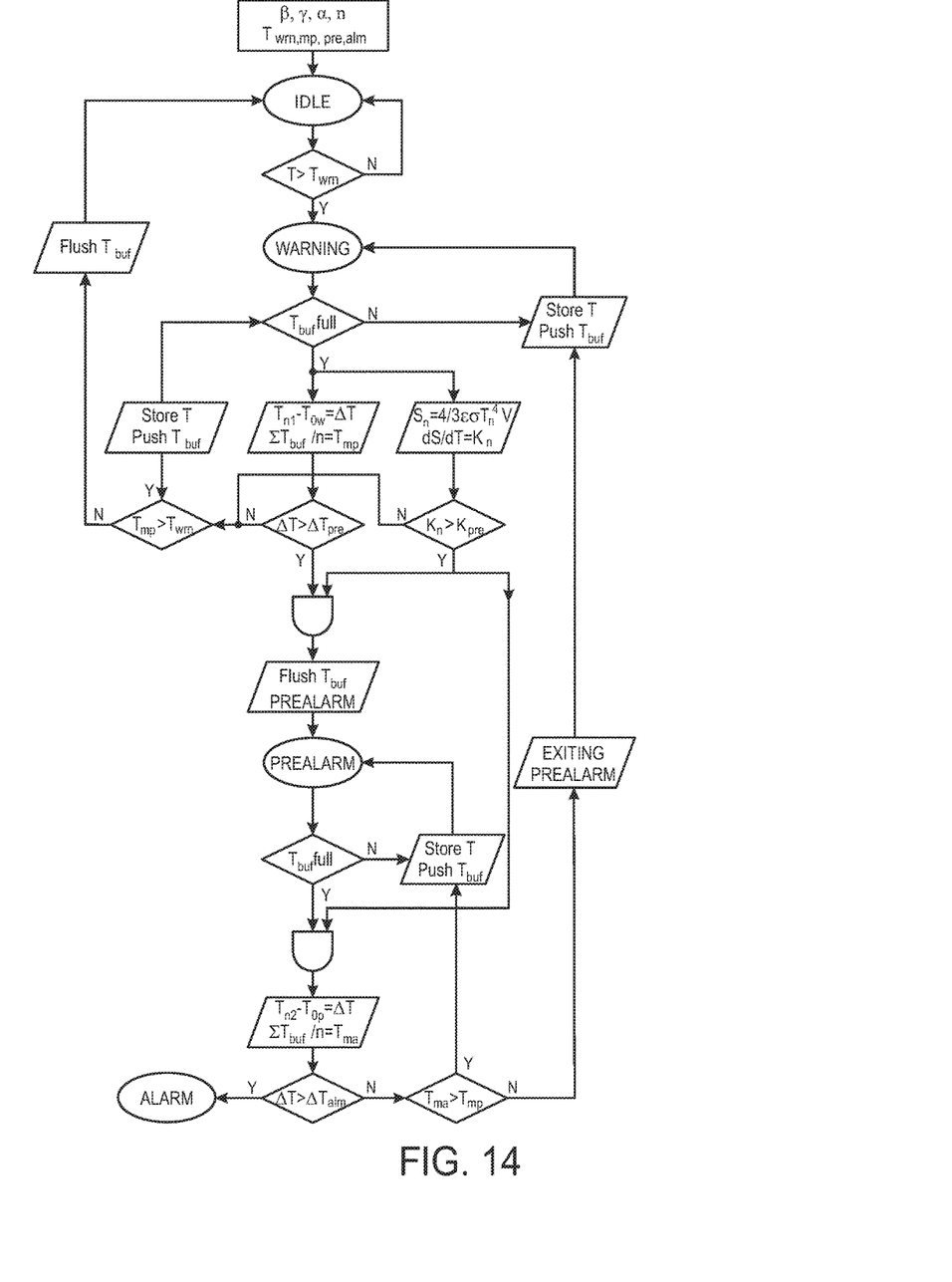
FIGS. 14 to 16 are flow diagrams illustrating one embodiment of the detection method according to the invention.
Figure 15:
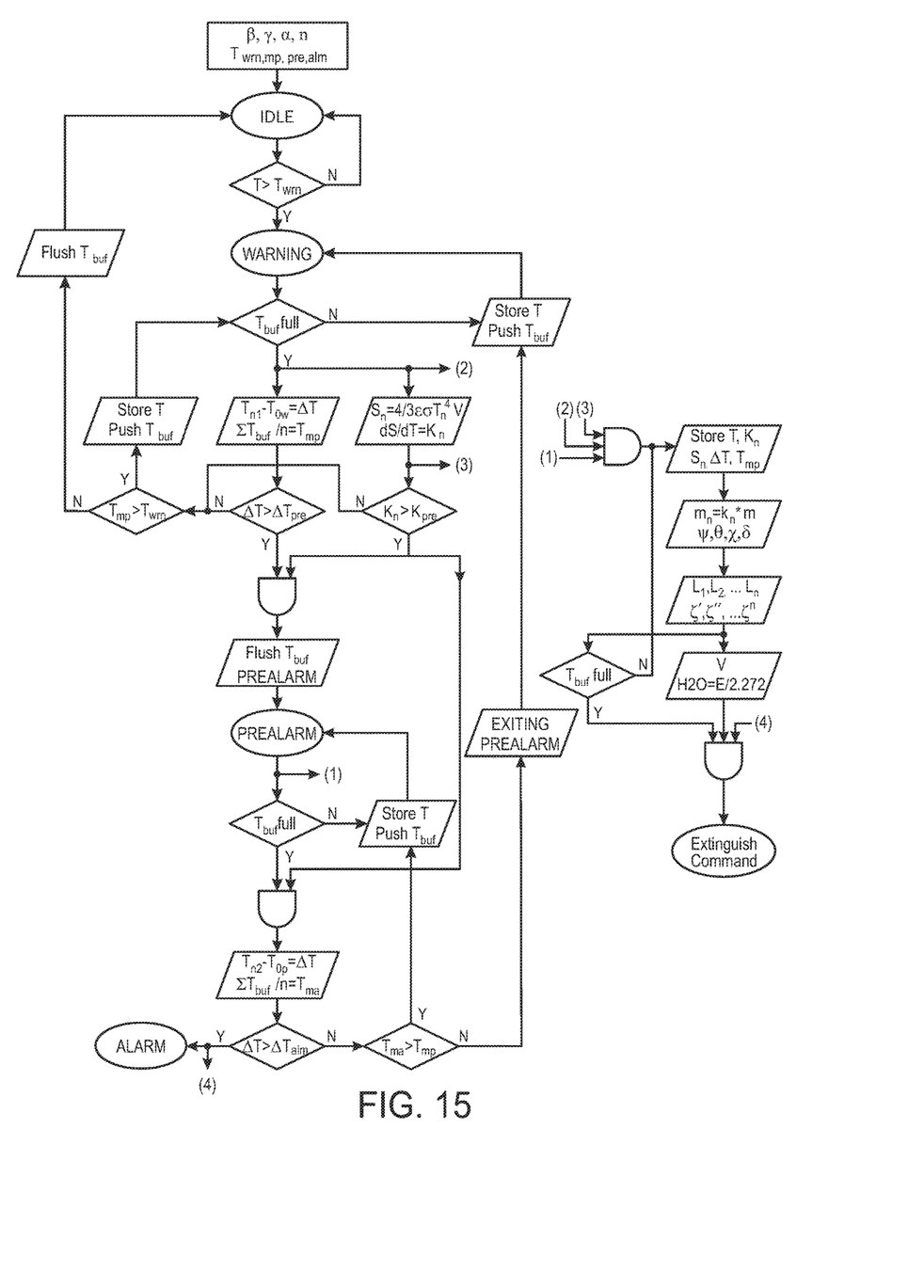
Figure 16:
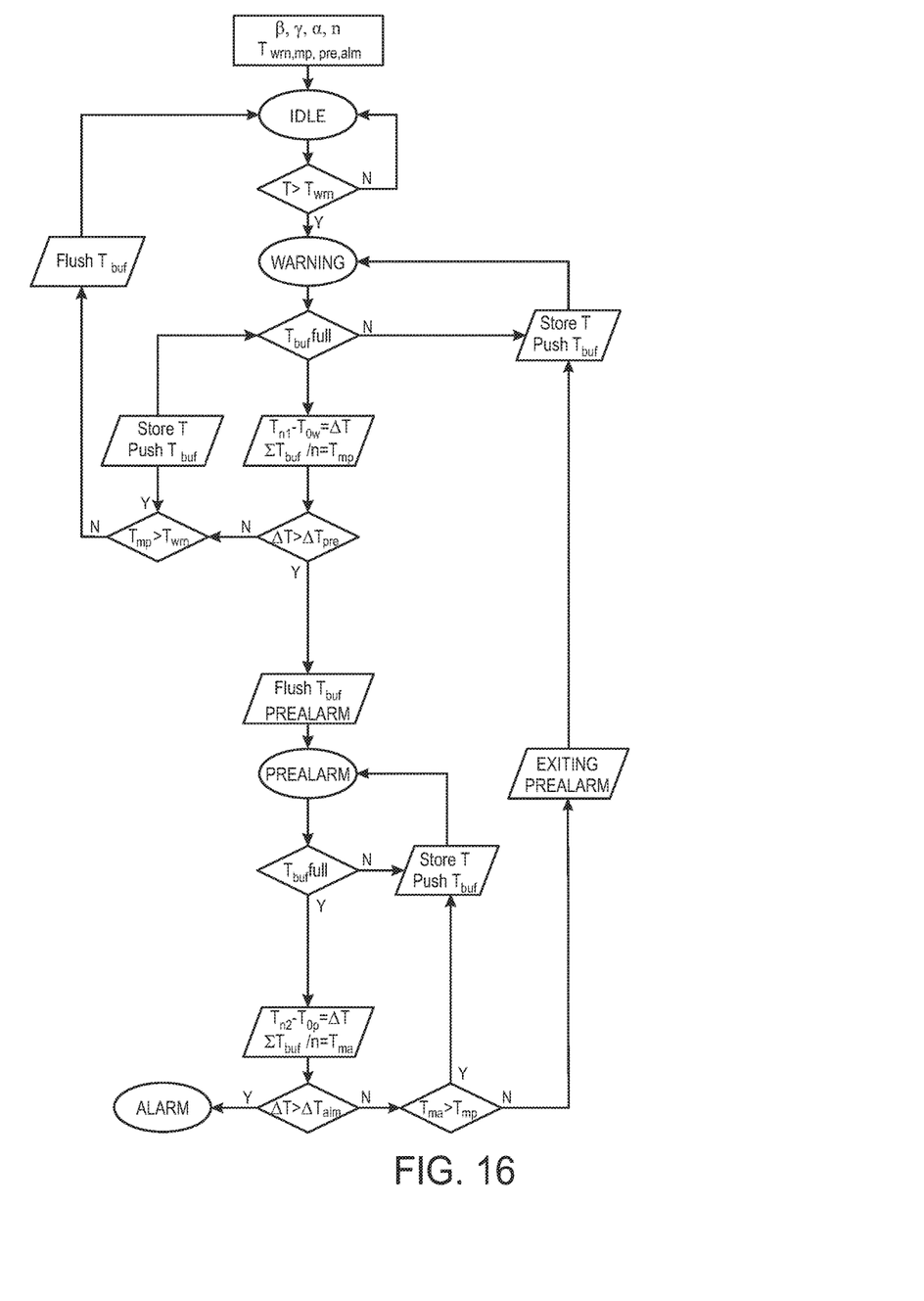

We describe now an algorithm for the detection of the thermal data, the localization of "abnormal" thermal sources and the extinguish command, by referring to the flow charts shown in FIGS. 14-16, representing respectively a composed algorithm, a composed algorithm with extinguish command, and a simple algorithm for thermal detection only.

Logical-Functional Flow Diagram of the Detector

The diagram provides four Functional States relating to particular and/or developing environmental conditions.

The temperature values are read at a time interval (t):

IDLE for each pixel the temperature value detected is compared in the time interval (t) with a threshold value $T_{wrn}$, if this threshold is exceeded, it switches to the next state.

WARNING for every single pixel in warning, the temperature value is stored in a FIFO buffer of size $n_1$ (in which the value also determines the observation time interval), if the buffer is full, the following values are calculated and stored $\Delta T=T_{n1}-T_{0w}$: Temperature difference between the last value in the buffer and the first $T_{mp}=\Sigma_{n1} T_{buf}$: Average temperature of the values present $q=\varepsilon \sigma T^4$: energy density of the values present $S_n=4/3\varepsilon \sigma T_n^3 V$: Entropy of the values present $dS_n/dT=k_n$: Entropic change in the period of observation The value ΔT is compared with a threshold value $\Delta T_{pre}$. The $k_n$ value is compared with a $k_{pre}$ threshold value.

If the thresholds of both values are exceeded, the buffer will be emptied and the PREALARM state will be launched by performing any necessary operations associated with the fire protection system (MT cut-off, blocking ventilation, closing doors, etc.).

If the threshold value is not exceeded, a further comparison is performed to evaluate whether to remain in the WARNING state or return to IDLE. If $T_{mp}$ or $k_n$ is greater than the threshold value, the WARNING state continues and the older temperature value are overwritten. Otherwise the buffer is emptied and returns to IDLE.

If the threshold value of $T_{mp}$ or $k_n$ is exceeded, a further check is made on all the values of the areas surrounding the area related to the WARNING condition, that is, the values of the eight adjacent areas are transcribed, monitored and recalculated using the same procedures in order calculate and monitor the propagation of the event, even if these values have not yet reached the threshold. The observation state remains until the WARNING values return. This implementation of the algorithm is used to calculate the quantity of extinguishing agent if it is activated.

PREALARM for each pixel in prealarm, the temperature value is stored in a FIFO buffer of size $n_2$. If the buffer is full, the following values are calculated and stored $\Delta T=T_{n2}-T_{0p}$: Temperature difference between the last value in the buffer and the first $T_{ma}=\Sigma_{n2}T_{buf}$: Average temperature of the values in the buffer The value ΔT is compared with a threshold value $\Delta T_{aim}$.

If for a time $t_k$ the values exceeding the $\Delta T_{aim}$ and $k_n$ threshold persist, the buffer will be emptied and the system will go into the ALARM state.

If the threshold value has not been exceeded, a further comparison will be performed to evaluate whether to remain in the PREALARM state or to return to WARNING, if $T_{ma}$ is greater than the $T_{mp}$, the system remains in PREALARM and the old temperature value is overwritten, otherwise any actions related to exiting the PREALARM state are performed (MT consent, turn on ventilation, open doors, etc.), the old temperature value is overwritten and the system will return to the WARNING state.

If the threshold value has not been exceeded, a further comparison will be performed to evaluate whether to remain in the PREALARM state or return to WARNING, if the $T_{ma}$ is greater than the $T_{mp}$, the system remains.

With the transition to the PREALARM condition, all functions that determine the localization and extent of the event are activated in a precise way $|dS_n/dT=k_n|dt \rightarrow$ determination of the most significant radiations that carry proportional m values, that is, $m_n=k_n*m$ (the calculation may be truncated to the first three significant values)

Determination of the characteristic angles of the sources according to the sensors: angles $\psi$, $\theta$, $\chi$, $\delta$ Calculation of reflection angles $\xi'$, $\xi''$ ... $\xi^n$ by the Euler and Carnot equations for each reflection $$|e/\sin(180-2\xi')=b/\sin(180-2'')|$$

$$|c^2+d^2=e^2+b^2-2e*b*\cos \psi|1,n$$

Figure 13:
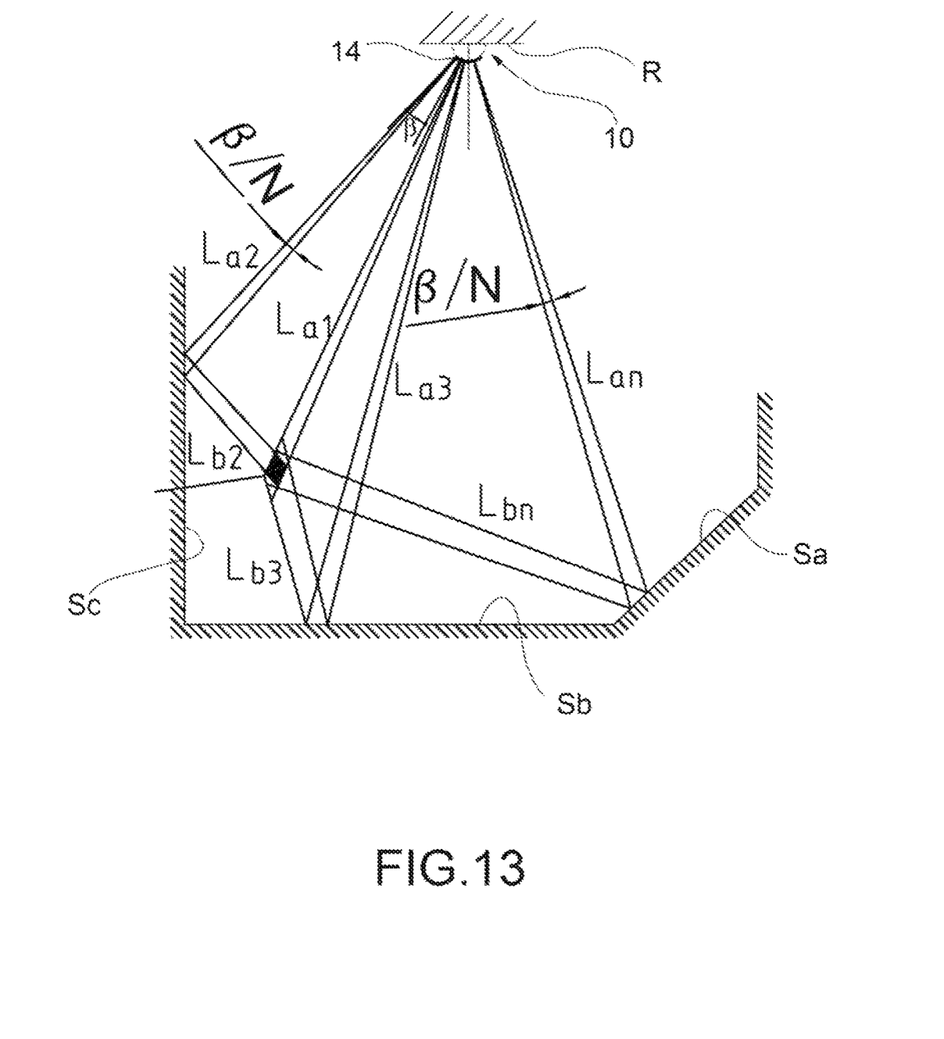

On the basis of these values, it is possible to derive the actual distances of each individual radiation emitted (FIG. 13)

$$L_1=L_{a1}+L_{b1} \rightarrow L_n=L_{an}+L_{bn}$$

The volume derived from the intersection of the various cones is $$V=(L^1_1+L^1_2+L^1_3)*tg(\beta/n)$$

Said volume is assumed to consist of a composition of generic combustible materials, such as those normally present in civil use spaces, and therefore, consisting of the same percentage of paper (wood), cotton and polyester. These materials have a calorific value of Q=18 MJ/kg and an average density of $\delta$=0.8 kg/dm$^3$. Therefore, the energy potential that said material can develop is equal to $E=Q*\delta*V$ The amount of extinguishing agent (e.g. water) required is equal to E/2.272 (kg) (the value 2.272 is given by the latent heat of water vaporization), the value must be conservatively multiplied by a safety factor of 3.

ALARM the start of a fire is detected and the corresponding actions are performed (activation of visual/acoustic signaling, activation of extinguishing, etc.).

The logic described above allows one to perform detection in 2 steps starting from an initial threshold value. This value is necessary to alleviate as much as possible the computational weight of the microcontroller in the IDLE stage.

Comparisons (and buffering in RAM) required to assess the transition to Prealarm or Alarm occur only on the pixels that are located respectively in a state of Warning and Prealarm.

The model enables users to manage trends for fires that are not strictly uniform.

The values of $n_1$, $n_2$, $T_{wrn}$, $\Delta T_{pre}$ and $\Delta T_{aim}$ are parametric so that the operating configuration may vary over different areas.

What is claimed is:

1. Method of detecting radiated thermal energy data in a confined space by infrared radiation image processing, the method comprising the steps of:

receiving a plurality of sequential series of infrared radiation images of the space, each of said images comprising an array of pixels, each pixel having a value that is representative of a temperature;

processing successive images of said plurality of sequential series of images to determine a change of at least one thermal parameter that meets predetermined alarm criteria;

detecting an event in the space based on the determined change of the thermal parameter;

wherein the method uses at least one infrared radiation fire detector, comprising a curved support surface and a plurality of infrared radiation sensors arranged on the support surface, wherein each sensor comprises a planar array of infrared radiation sensitive elements, having a respective sight direction and a solid angle of view defined around the sight direction, which define a field of view associated to the sensor, wherein the sight directions of the sensors intersect with one another at a central point and the sensors are spaced apart from one another by a given angular distance referred to the central point, the solid angles of view of the sensors having a same narrow width so that the fields of view of the sensors are non-intersecting with one another, and wherein each sequential series of images is detected by a respective sensor of the fire detector; and identifying the position of a source associated to the detected event, a first fraction of the infrared radiation emitted by the source being detected directly by only one of the sensors of the fire detector, and a second fraction of the infrared radiation emitted by the source being detected by at least another sensor of the fire detector after having been reflected by at least one surface of the space, the position of the source being calculated as a function of a geometrical relationship between the sight directions of the sensor that detects the first fraction of the infrared radiation and the at least another sensor that detects the second fraction of the infrared radiation.

* * * * *